(12) United States Patent
Mohacsi

(10) Patent No.: US 9,707,916 B2
(45) Date of Patent: Jul. 18, 2017

(54) GRILLE ASSEMBLIES FOR VEHICLES

(71) Applicant: Toyota Motor Engineering & Manufacturing North America, Inc., Erlanger, KY (US)

(72) Inventor: Kris A. Mohacsi, Livonia, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 202 days.

(21) Appl. No.: 14/667,739

(22) Filed: Mar. 25, 2015

(65) Prior Publication Data

US 2016/0200273 A1 Jul. 14, 2016

Related U.S. Application Data

(60) Provisional application No. 62/101,553, filed on Jan. 9, 2015.

(51) Int. Cl.
B60R 19/52 (2006.01)

(52) U.S. Cl.
CPC ........ B60R 19/52 (2013.01); *B60R 2019/525* (2013.01)

(58) Field of Classification Search
CPC .................. B60R 19/52; B60R 2019/525
USPC ........................................ 296/193.1; 29/428
See application file for complete search history.

(56) References Cited

U.S. PATENT DOCUMENTS

| | | | |
|---|---|---|---|
| 6,206,438 B1 | 3/2001 | Pueyo | |
| 7,464,984 B1 * | 12/2008 | McDaniel | B60R 19/52 |
| | | | 180/68.6 |
| 7,766,111 B2 * | 8/2010 | Guilfoyle | B60K 11/04 |
| | | | 180/68.1 |
| 8,038,204 B1 * | 10/2011 | Baker | B60R 13/00 |
| | | | 296/1.08 |
| 8,070,195 B2 * | 12/2011 | Huang-Tsai | B60R 19/52 |
| | | | 293/115 |
| 8,640,802 B2 | 2/2014 | Schneider | |
| 2009/0066096 A1 | 3/2009 | Doroghazi et al. | |
| 2011/0005851 A1 | 1/2011 | Doroghazi et al. | |

(Continued)

FOREIGN PATENT DOCUMENTS

DE 102007017444 A1 * 10/2008 ............. B60R 19/52
DE 102012022903 7/2013

OTHER PUBLICATIONS

Volkswagen Grille Insert, http://vvww.partstrain.com/ShopByDepartment/Grille_Insert/VOLKSWAGEN.

(Continued)

*Primary Examiner* — Pinel Romain
(74) *Attorney, Agent, or Firm* — Dinsmore & Shohl LLP

(57) ABSTRACT

Grille assemblies, vehicles including grille assemblies, and methods of concealing one or more components of a vehicle are disclosed herein. A grille assembly may include an inner frame defining a central opening therethrough. The inner frame may include a lower portion having a concealment flange. The concealment flange may extend from the inner frame toward an engine compartment portion of the vehicle at a depth. The concealment flange may extend such that it obscures one or more vehicle components positioned adjacent to the central opening when viewed from a location outside the engine compartment through the grille assembly.

22 Claims, 7 Drawing Sheets

(56) References Cited

U.S. PATENT DOCUMENTS

| | | | |
|---|---|---|---|
| 2011/0049930 A1* | 3/2011 | Delwal | B05B 13/0285 |
| | | | 293/102 |
| 2011/0204680 A1* | 8/2011 | Fortin | B60R 19/18 |
| | | | 296/193.1 |
| 2015/0102627 A1* | 4/2015 | Pickartz | B60L 11/1818 |
| | | | 296/97.22 |
| 2016/0193977 A1* | 7/2016 | Calleja | B60R 19/12 |
| | | | 293/115 |

OTHER PUBLICATIONS

Suzuki Grand Vitara Grille Assembly, http://www.carparts.com/suzuki/grand-vitara/grilleassembly.

* cited by examiner

GRILLE ASSEMBLIES FOR VEHICLES

CROSS REFERENCE TO RELATED APPLICATIONS

The present application claims priority to U.S. Provisional Patent Application Ser. No. 62/101,553, filed Jan. 9, 2015 and entitled "Grille Assemblies For Vehicles," which is incorporated by reference herein in its entirety.

TECHNICAL FIELD

The present specification generally relates to grille assemblies for a vehicle and, more specifically, to grille assemblies for a vehicle with concealment flanges for obscuring components within an engine compartment of the vehicle.

BACKGROUND

Front-engine vehicles include an engine compartment situated at the front of the vehicle. The engine compartment houses the vehicle drive source, such as an engine and/or a motor, as well as other mechanical and/or electrical components required for vehicle operation. The front of the engine compartment may also include a front fascia through which air may enter the engine compartment and circulate to assist with cooling the various components located in the engine compartment. The front fascia may optionally include a grille. The grille may perform several functions. For example, the grille may prevent debris such as leaves, paper, etc., from entering the engine compartment and interfering with and/or damaging vehicle components. The grille may also serve as an aesthetic embellishment to the vehicle. In either case, the grille is generally constructed with an open structure so as to allow air to pass through the grille and enter the engine compartment.

Because the grille is constructed with an open structure, various components of the vehicle may be readily visible through the grille which may adversely impact the aesthetics of the vehicle.

Accordingly, a need exists for alternative grille structures which can be used to obscure vehicle components internal to the engine compartment while still allowing air to circulate into the engine compartment.

SUMMARY

In an embodiment, a grille assembly for a vehicle includes an inner frame defining a central opening therethrough. The inner frame includes a lower portion having a concealment flange. The concealment flange extends from the inner frame toward an engine compartment portion of the vehicle at a depth. The concealment flange extends such that it obscures one or more vehicle components positioned adjacent to the central opening when viewed from a location outside the engine compartment through the grille assembly.

In an embodiment, a vehicle includes an engine compartment and a grille assembly. The grille assembly includes a lower portion having a concealment flange that extends from the inner frame toward the engine compartment of the vehicle at a depth such that the concealment flange obscures one or more vehicle components adjacent to the central opening when viewed from a location outside the engine compartment through the grille assembly.

In an embodiment, a method of concealing one or more components positioned at or in an engine compartment of a vehicle includes attaching an inner frame defining a central opening therethrough to a perimeter of an opening in the engine compartment. The inner frame includes a lower portion having a concealment flange that extends from the inner frame towards the engine compartment at a depth such that the concealment flange obscures the one or more components that are adjacent to the central opening when viewed from a location outside the engine compartment through the grille assembly.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The grille assembly generally described herein may include an inner frame which may be positioned at or near a front of an engine compartment of a vehicle, particularly at a front opening of the engine compartment. The inner frame may include a concealment flange which extends towards the engine compartment of the vehicle to a depth sufficient to conceal vehicle components within the engine compartment from view when the engine compartment is observed through the inner frame from outside of the engine compartment. The concealment flange generally extends inboard along a lower portion and/or one or more side portions of a circumference of the inner frame, as such portions are most likely to be viewable to an average observer when the grille assembly is attached to the vehicle. In some embodiments, the grille assembly may further include an outer grille which attaches to the inner frame, an inner grille positioned in the outer grille, and a trim ring positioned between the inner grille and the outer grille. Various embodiments of grille assemblies for vehicles which include concealment flanges will be described in more detail herein with specific reference to the appended drawings.

As used herein, "vehicle components" are generally any components of a vehicle. More particularly, the vehicle components are components located in, on, or adjacent to an engine compartment of the vehicle. Even more particularly, the vehicle components are components located adjacent to an opening that may be visible to an average observer located outside the vehicle when in a generally upright, standing position. Nonlimiting examples of vehicle components that may be visible include clips, fasteners, and/or the like, particularly the clips, fasteners, and/or the like described herein that are used to attach the various components together (e.g., the clips used to attach the outer grille, the inner grille, and the trim ring to the outer frame).

As used herein, directional references (such as inward, inboard, outward, outboard, upward, forward, rearward, and the like) are in relation to the positioning of the components when incorporated into an automotive vehicle. As such, the forward direction (e.g., the +x direction) is generally towards the front 25 of the vehicle 10; the inboard or inner direction is generally towards a center or center line of the vehicle 10; the outboard or outward direction is generally away from the center or center line of the vehicle 10; the upward direction (e.g., the +z direction) is generally toward a roof of the vehicle 10; the downward direction (e.g., the −z direction) is generally toward the ground on which the vehicle 10 rests; and the rearward direction (e.g., the −x direction is generally toward a rear of the vehicle 10.

Figure 1:
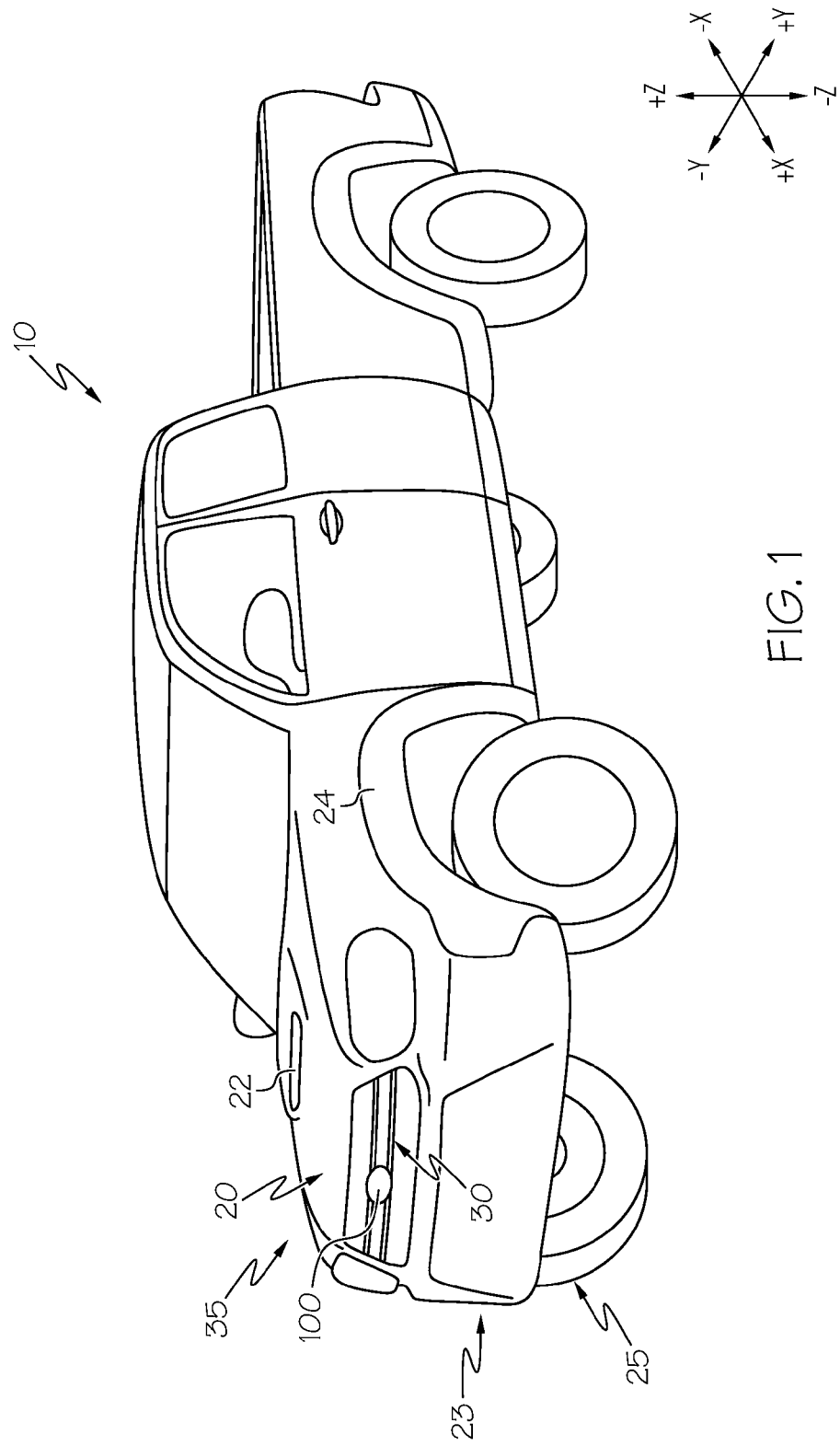
FIG. 1 schematically depicts a side perspective view of a vehicle with an illustrative grille assembly according to one or more embodiments shown and described herein.

Motor vehicles that incorporate elements according to the present disclosure may include a variety of construction methodologies that are conventionally known, including the unibody construction methodology depicted in FIG. 1, as well as body-on-frame construction methodology. While embodiments described herein may be described and depicted as unibody structures, it should be understood that vehicles constructed with body-on-frame construction may incorporate the elements shown and described herein. Furthermore, the figures may only show one side of the vehicles. Descriptions of the other size may be omitted because both sides of the vehicle may be laterally symmetrical and substantially the same.

As shown in FIG. 1, a vehicle, generally designated 10, is schematically depicted. While FIG. 1 depicts the vehicle 10 as a pick-up truck, it may be recognized that the vehicle may be a sedan, coupe, sport-utility vehicle (SUV), or the like in various other embodiments. The vehicle 10 may include an engine compartment 20 located at a front 25 of the vehicle. In some embodiments, the engine compartment 20 may be at least partially enclosed by various vehicle components.

Illustrative components that may be used to enclose the engine compartment 20 may include, but are not limited to, a hood 22, one or more fenders, and a front bumper assembly 23. For example, the engine compartment 20 may be enclosed on four sides by the vehicle hood 22, the front bumper assembly 23, and the left and right fenders (left fender 24 depicted in FIG. 1) which are attached to front side members (not shown) that form the sides of the engine compartment. The engine compartment 20 may generally be a hollow cavity that houses various components of the vehicle 10, such as, for example, the engine and/or motor, cooling systems (e.g., a radiator), electrical systems and/or the like. Various other parts and components of the vehicle, such as body panels, bumpers, suspension components, etc. may be attached to the vehicle either in the engine compartment 20 or through the front side members.

In various embodiments, a portion of the engine compartment 20 may be open at the front bumper assembly 23 to allow air to flow into the engine compartment and to protect the radiator engine/motor of the vehicle. Such an opening 30 may assist in cooling various vehicle components, particularly components located in the engine compartment 20. In some embodiments, the opening 30 may be located at or near a front 35 of the engine compartment 20. The front 35 of the engine compartment 20 may correspond to the front 25 of the vehicle 10. However, it will be recognized that the opening 30 may be located in various other locations, such as the sides, the top, and the bottom of the engine compartment (e.g., a hood scoop, a lower grille assembly, or the like). In some embodiments, when the opening 30 is located on the front 35 of the engine compartment 20, it may allow for airflow into the engine compartment, particularly when the vehicle 10 is in forward motion. Airflow movement into the engine compartment 20 may generally provide circulation to assist with cooling various vehicle components located in the engine compartment. In addition to air, other debris may enter the engine compartment 20 via the opening 30 if the opening is not appropriately shielded. Thus, in some embodiments, a grille assembly 100 may be positioned in the opening 30. The grille assembly 100 may prevent debris such as leaves, paper, road waste, animals, insects, and/or the like from entering the engine compartment 20 and interfering with and/or damaging various vehicle components. Additionally, the grille assembly 100 may be constructed so as to not hinder and even aid the flow of air into the engine compartment 20. In some embodiments, the grille assembly 100 may also serve as an aesthetic embellishment containing indicia, trim, and/or the like, as described in greater detail herein.

Figure 2:
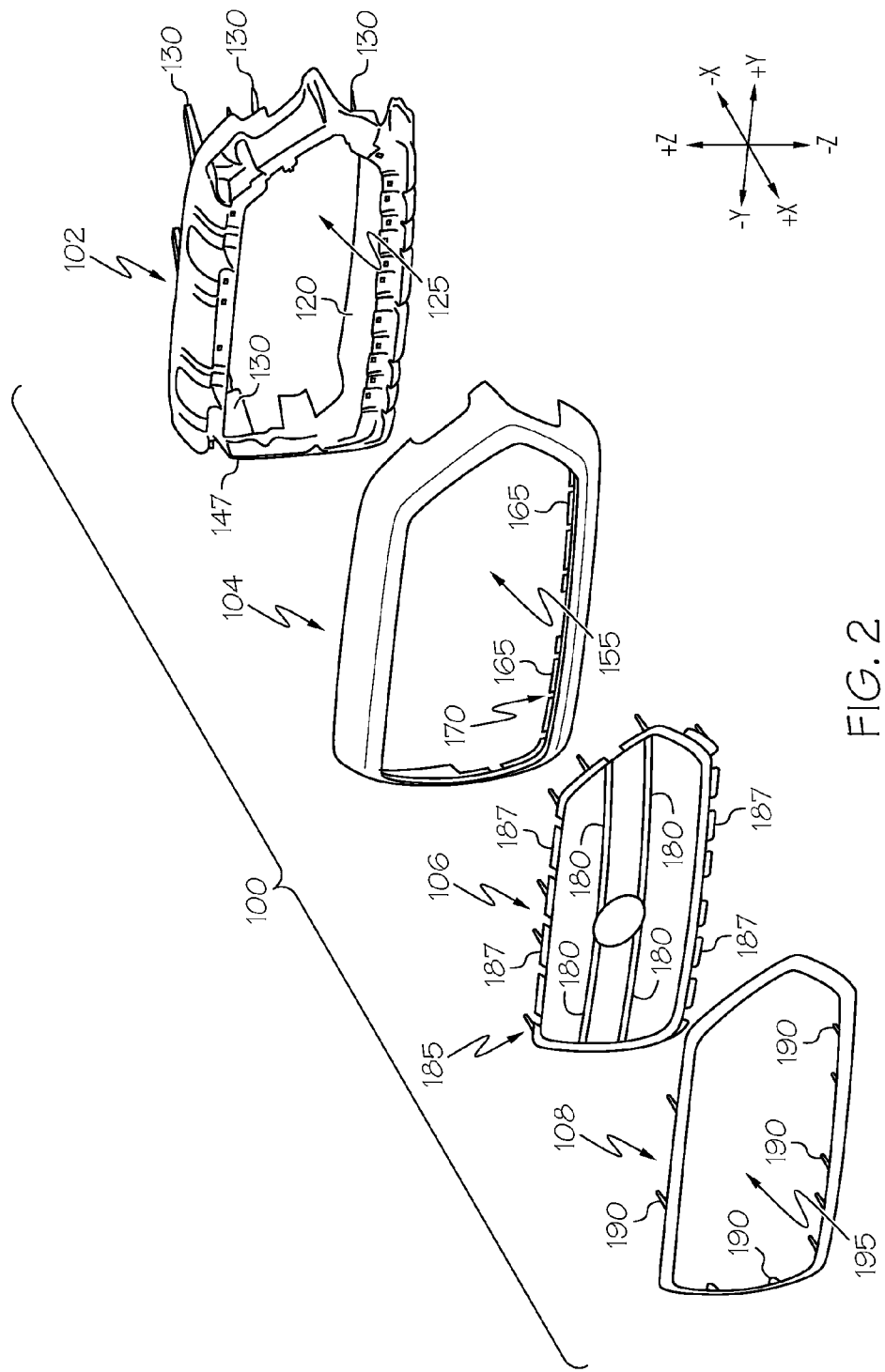
FIG. 2 schematically depicts an exploded view of an illustrative grille assembly for a vehicle according to one or more embodiments shown and described herein.

As depicted in FIG. 2, in various embodiments, the grille assembly 100 may include a plurality of portions. For example, in some embodiments, the grille assembly 100 may include an inner frame 102, an outer grille 104, an inner grille 106, and a trim ring 108. However, it will be recognized that additional or fewer portions may be included in the grille assembly 100 without departing from the scope of the present disclosure. For example, in some embodiments, certain portions may be combined together in a single unit or may be separated into a plurality of units.

Referring to FIGS. 1-4, in various embodiments, the inner frame 102 may serve as a primary mounting structure for attaching the grille assembly 100 to the vehicle 10. That is, the inner frame 102 may attach to a portion of the front bumper assembly 23 and the engine compartment 20 (FIG. 1). For example, in some embodiments, the inner frame 102 may attach to a perimeter of the opening 30 in the front bumper assembly 23. Accordingly, the inner frame 102 may include one or more attachment devices 130 for attaching the inner frame to the vehicle 10. The attachment devices 130 are not limited by this disclosure, and may generally include any devices that are used for attachment. Nonlimiting examples of attachment devices may include tabs, fasteners, recesses, slots, adhesives, welding, and/or the like. In a particular nonlimiting example, the attachment devices 130 may be a plurality of tabs that extend from a rearward surface 135 of the inner frame 102 in the −x direction of the axis depicted in FIGS. 1-4 towards the engine compartment 20 of the vehicle 10. The tabs 130 correspond to slots located in the engine compartment 20 and/or the front bumper assembly 23 such that, when the tabs are inserted into the slots, the inner frame 102 is secured into place around the opening 30. Such tabs would be viewable through the grille assembly 100 if not concealed by a concealment flange 120, as described in greater detail herein.

The inner frame 102 may generally be constructed as a closed loop that defines a central opening 125 therethrough. In some embodiments, the central opening 125 may generally correspond in shape and/or size to the opening 30 of the engine compartment 20 through the front bumper assembly 23. Thus, cooling air from outside the vehicle 10 may pass through the central opening 125 and the opening 30 into the engine compartment 20. In addition, the inner frame 102 may be molded such that it fits in or around the opening 30 through the front bumper assembly 23 to the engine compartment 20. Accordingly, the inner frame 102 may be placed in or around the opening 30 such that few or substantially no gaps are present between the opening 30 and the inner frame 102. The inner frame 102 may further be molded such that it contains one or more slots or other attachment mechanisms located at or near an outer edge 147 of the inner frame 102, such as a bottom edge 150 and/or a top edge 152, as described in greater detail herein.

The inner frame 102 may further be constructed of any material, particularly materials now known or later developed for vehicle grille assemblies. In some embodiments, the inner frame 102 may be constructed from a molded polymeric resin, such as, for example, one or more thermoplastic polymers. Illustrative thermoplastic polymers may include, but are not limited to, polyolefins, polyesters, polycarbonates, polyethers, polyurethanes, polystyrenes, high-impact polystyrenes and/or the like. A particular thermoplastic polymer may be acrylonitrile butadiene styrene (ABS) plastic.

The inner frame 102 may generally be any color, particularly opaque colors suitable for concealing one or more components in the engine compartment 20 and/or avoiding the attention of an observer. Such suitable colors may include, but are not limited to, a dark colors such as black, grey, dark brown, dark blue, and/or the like. However, in some embodiments, a bright or light color, such as red, orange, yellow, blue, silver, gold, and/or the like may be used for aesthetic embellishment of the vehicle 10 (while still concealing one or more components in the engine compartment 20). In some embodiments, the color may have a matte finish. In some embodiments, non-matte finishes, particularly glossy finishes, may be avoided, as such finishes may draw attention to the inner frame 102. However, in some embodiments, a glossy finish may be used for aesthetic embellishment of the vehicle 10. One nonlimiting example may be an injection molded inner frame 102 that is injection molded from polymer materials which have a matte black color such that the finished inner frame 102 also has a matte black finish. Another nonlimiting example may be an injection molded inner frame 102 that is injection molded from polymer material having a glossy silver (e.g., chrome) color such that the finished inner frame used for aesthetic embellishment also has a glossy silver finish.

Figure 3:
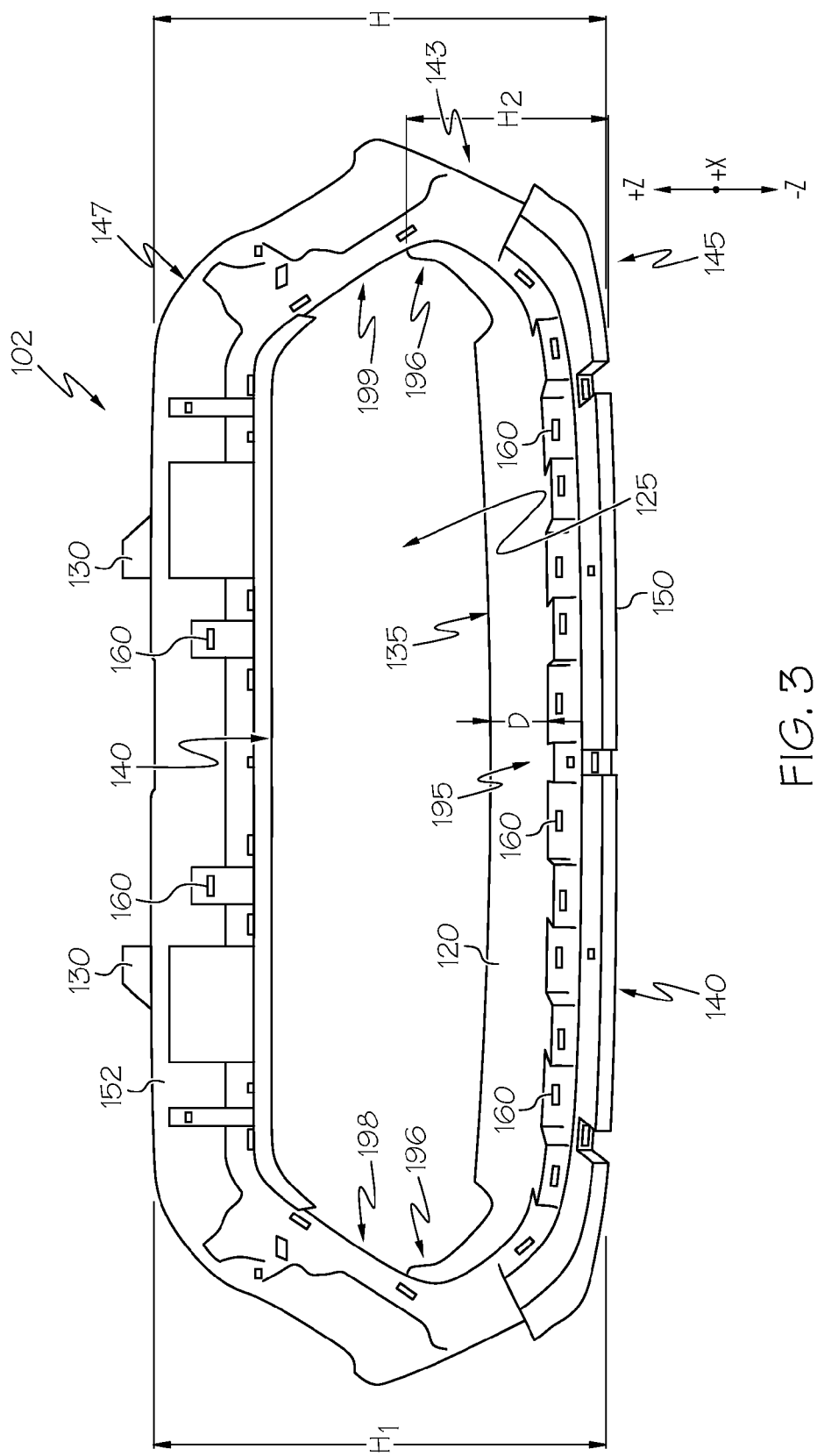
FIG. 3 schematically depicts a front elevational view of an illustrative inner frame of a grille assembly with a concealment flange according to one or more embodiments shown and described herein.
Figure 4:
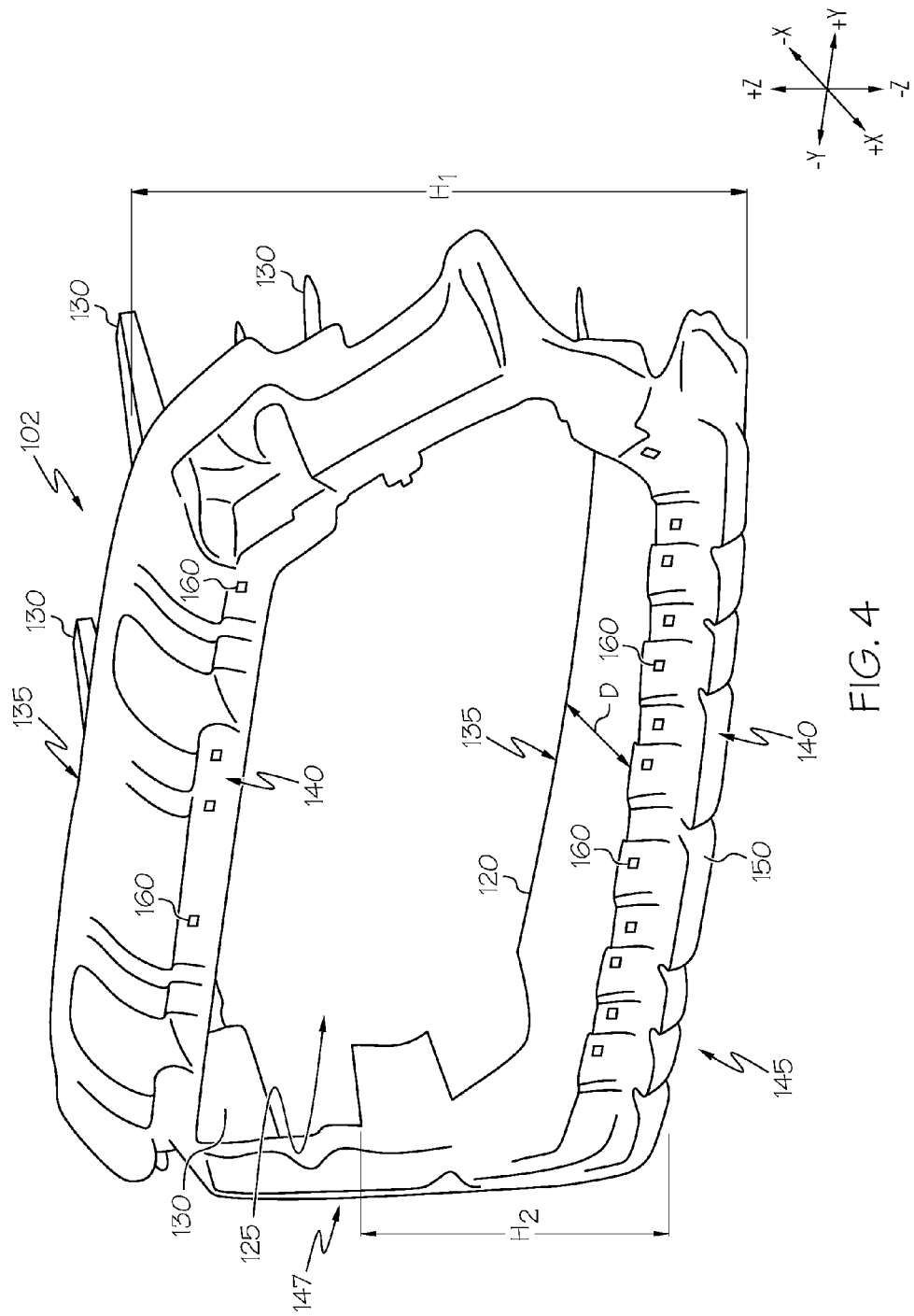
FIG. 4 schematically depicts side perspective view of the inner frame of FIG. 3 according to one or more embodiments shown and described herein.

In various embodiments, the inner frame 102 may also include a concealment flange 120. The concealment flange 120 may be shaped, sized, and positioned such that it conceals one or more components in the engine compartment 20, particularly components located adjacent to the opening 30. For example, the concealment flange 120 may conceal clips, tabs, and/or the like inserted into the one or more slots 160 of the inner frame 102 (FIGS. 3 and 4). The concealment flange 120 may extend from the rearward surface 135 of the inner frame 102 (FIG. 4) into the engine compartment 20 (i.e., in the −x direction of the coordinate axes depicted in FIGS. 1-4). In some embodiments, the concealment flange 120 may be positioned such that the slots 160 are located between an edge 147 of the inner frame 102 and the concealment flange 120. In some embodiments, at least a first portion 195 of the concealment flange 120 may extend in a substantially horizontal direction and at least one second portion 196 of the concealment flange 120 may extend in a substantially vertical direction. In other words, at least the first portion 195 may extend from a first side edge 198 of the inner frame 102 to a second side edge 199 of the inner frame 102 and at least one second portion may extend from a bottom edge 150 towards a top edge 152 of the inner frame 102.

In some embodiments, the concealment flange 120 may be integrally formed with the inner frame 102. Thus, in embodiments where the inner frame 102 is injection molded, the concealment flange 120 may be injection molded as an integral portion of the inner frame 102. In other embodiments, the concealment flange 120 may be formed as a separate component which is removably attached to the inner frame 102, such as with clips, screws, adhesives, welding, or the like. A removably attached concealment flange 120 may be used, for example, in embodiments where the inner frame 102 is an existing vehicle part and the concealment flange 120 that is an aftermarket part that is retrofitted after the manufacture of the inner frame and/or various other vehicle components. Such a removably attached concealment flange 120 may allow for greater compatibility with a plurality of vehicles and/or components thereof. In the embodiments described herein, the concealment flange 120 may generally be a dark, matte color to assist with obscuring and concealing various vehicle components housed within the engine compartment 20. For example, in embodiments where the concealment flange 120 is injection molded, the concealment flange 120 may be injection molded from polymer materials which have a matte black color such that the finished concealment flange 120 also has a matte black finish. In some embodiments, the concealment flange 120 may be injection molded as a portion of the inner frame 102 such that the inner frame 102 and the concealment flange 120 have the same or a similar color and finish.

As previously described herein, the concealment flange 120 may extend toward and even into the engine compartment 20, depending on a depth of the concealment flange 120 into the vehicle. The concealment flange 120 may generally extend to the depth D that is sufficient to obscure and conceal vehicle components positioned in the engine compartment 20, particularly components that are adjacent to the opening 30. Thus, the concealment flange 120 may act as a lip or the like that extends over a rearward surface 135 of the inner frame 120 to obscure the rearward surface and/or the adjacent components (FIGS. 3 and 4). The vehicle components may be considered to be obscured if they are generally not viewable when an observer is positioned in front of the grille assembly 100 in a generally upright standing position and is looking through the grille assembly from outside the engine compartment 20, as described in greater detail herein. For example, the concealment flange 120 may extend into the engine compartment to a depth D that is sufficient to obscure components which are attached to the interior of the engine compartment 20 and/or have a color which would otherwise be readily visible to the naked eye through the grille assembly 100. Such components include, without limitation, painted bumper attachments, the outer grille attachment members, the inner grille attachment members, the trim ring attachment members, and/or the like. It may be recognized that other components not specifically described herein may be concealed by the concealment flange 120 without departing from the scope of the present disclosure. In some embodiments, the depth D may be uniform across the entire width of the concealment flange 120. In other embodiments, the depth D may be non-uniform (i.e., certain portions of the concealment flange 120 may contain different depths). In some embodiments, an average depth D to which the concealment flange 120 extends may be greater than or equal to about 10 cm. In some other embodiments, an average depth D may be from about 10 cm to about 20 cm, including about 10 cm, about 11 cm, about 12 cm, about 13 cm, about 14 cm, about 15 cm, about 16 cm, about 17 cm, about 18 cm, about 19 cm, about 20 cm, or any value or range between any two of these values (including endpoints). It should be recognized that other depths D not specifically described herein are included without departing from the scope of the present disclosure.

In various embodiments, referring particularly to FIGS. 3 and 4, the concealment flange 120 extends from the rearward surface 135 of the inner frame 102 on at least a portion of an inner circumference 143 of the inner frame 102 defining a perimeter of the opening 125. That is, the concealment flange 120 may extend across a lower portion 145 of the inner frame 102 in the +/− y direction from the first side edge 198 towards the second side edge 199 and curves upward (i.e., in the +z direction) at one or more of the side edges 198, 199 of the inner frame 102 towards the top edge 152. In some embodiments, the concealment flange 120 may extend across the lower portion 145 and curve upward by generally following the shape and/or dimensions of an inner circumference of the inner frame 102. For example, in embodiments where the inner frame 102 has an overall height $H_1$ (e.g., a frame height), as depicted in FIG. 3 and FIG. 4, the concealment flange 120 may extend in the vertical direction (+z direction) to a flange height $H_2$ that is less than the overall height $H_1$ but greater than or equal to one half of the overall height (e.g., $H/2$). In some embodiments, the flange height $H_2$ may be about 1 millimeter (mm) to about 120 mm from a bottom edge 150 of the inner frame, including about 1 mm, about 5 mm, about 10 mm, about 25 mm, about 50 mm, about 100 mm, about 110 mm, about 120 mm, or any value or range between any two of these values (including endpoints). In a particular embodiment, the flange height $H_2$ may be about 118 mm. Extending the concealment flange 120 in a vertical direction to the flange height $H_2$ may obscure and conceal components located to the side of the opening 30, including, without limitation, painted bumper attachments, the outer grille attachment clips, the inner grille attachment clips, the trim ring attachment clips, and the like. In addition, the flange height $H_2$ may be such that the flange does not block, hinder, or otherwise interfere with various components that may be located adjacent to an upper portion 147 of the inner frame 102.

In various embodiments, the outer grille 104 may be generally positioned over and attached to the inner frame 102, thereby concealing most of a forward surface 140 of the inner frame 102 from view when the grille assembly 100 is viewed from outside the engine compartment 20 of the vehicle 10. That is, like the inner frame 102, the outer grille 104 is constructed as a closed loop which is that contains a central opening 155 to allow cooling air to enter into the engine compartment 20 through the central opening 125 of the inner frame 102 and the central opening 155 of the outer grille 104. In some embodiments, the central opening 155 of the outer grille 104 may generally correspond in shape and/or size to the opening 30 through the front bumper assembly 23 to the engine compartment 20 and/or the central opening 125 of the inner frame 102. Thus, cooling air from outside the vehicle 10 may pass through each respective central opening 125, 155 and the opening 30 into the engine compartment 20. In addition, the outer grille 104 may be molded such that it fits in or around the central opening 125 of the inner frame 102 and/or the opening 30 of the engine compartment.

The outer grille 104 may further be constructed of any material, particularly materials now known or later developed for vehicle grille assemblies. In some embodiments, the outer grille 104 may be constructed from a molded polymeric resin, such as, for example, one or more thermoplastic polymers. Illustrative thermoplastic polymers may include, but are not limited to, polyolefins, polyesters, polycarbonates, polyethers, polyurethanes, polystyrenes, high-impact polystyrenes and/or the like. A particular thermoplastic polymer may be acrylonitrile butadiene styrene (ABS) plastic.

The outer grille 104 may generally be any color. In some embodiments, the outer grille 104 may be painted to match the body color of the vehicle 10. For example, if the body color of the vehicle 10 is white, the outer grille 104 may be painted white. In other embodiments, the outer grille 104 may have a metalized finish such that the outer grille has an appearance of being chromed.

The outer grille 104 may be attached to the inner frame 102 via any means of attachment. For example, in some embodiments, the outer grille 104 may be attached to the inner frame 102 with one or more mechanical fasteners 165 such as clips, screws, adhesives, welding, or a combination of clips and screws. For example, a rear surface 170 of the outer grille 104 (FIG. 2) may be formed with one or more clips 165, such as j-clips or the like, and the inner frame 102 may be formed with corresponding slots 160 therethrough for receiving the j-clips. Accordingly, the outer grille 104 may be snapped in place on the inner frame 102 by inserting the one or more clips 165 of the outer grille 104 into the corresponding slots 160 of the inner frame 102. The slots 160 on the inner frame 102 may be positioned such that they are located outside the concealment flange 120 (e.g., between the bottom edge 150 and the concealment flange) such that, when the clips 165 of the outer grille 104 are inserted into the slots 160, they are concealed by the concealment flange 120 such that an observer facing the forward surface 140 cannot see the clips 165.

Referring again to FIG. 3, the inner grille 106 may generally be positioned within the central opening 155 of the outer grille 104. The inner grille 106 may rest against a datum or a plurality of datums formed on an inner diameter of the outer grille 104 such that the inner grille 106 is oriented with respect to the outer grille 104. Thus, the orientation of the outer grille 104 may generally correspond to the orientation of the inner grille 106.

In various embodiments, the inner grille 106 may be formed to include one or more ribs 180 that extend across the central opening 155 of the outer grille 104. The ribs 180 may extend horizontally (e.g., between side edges 198, 199), vertically (e.g., between bottom edge 150 and top edge 152), and/or diagonally (e.g., between any of the edges 150, 152, 198, 199). Thus, in embodiments with a plurality of ribs 180, such ribs may intersect each other in a criss-cross pattern. Accordingly, in some embodiments, the ribs 180 may be intersecting ribs. The intersecting ribs may form a grid of openings that allow cooling air to pass through the inner grille 106, the outer grille 104, and the inner frame 102 and into the engine compartment 20, as described in greater detail herein. However, the openings formed by the ribs 180 are sufficiently sized so as to prevent larger pieces of debris and/or other foreign matter from entering the engine compartment of the vehicle 10.

Similar to the other components described herein, the inner grille 106 may be constructed of any material, particularly materials now known or later developed for vehicle grille assemblies. In some embodiments, the inner grille 106 may be constructed from a molded polymeric resin, such as, for example, one or more thermoplastic polymers. Illustrative thermoplastic polymers may include, but are not limited to, polyolefins, polyesters, polycarbonates, polyethers, polyurethanes, polystyrenes, high-impact polystyrenes and/or the like. A particular thermoplastic polymer may be acrylonitrile butadiene styrene (ABS) plastic.

The inner grille 106 may generally be any color. In some embodiments, the inner grille 106 may have a metalized finish such that the inner grille 106 has an appearance of being chromed. In some other embodiments, the inner grille 106 may be painted to match the body color of the vehicle 10. For example, if the body color of the vehicle 10 is white, the inner grille 106 may be painted white.

The inner grille 106 may be attached to the inner frame 102 via any means of attachment. For example, in some embodiments, the inner grille 106 may be attached to the inner frame 102 with one or more mechanical fasteners 187 such as clips, screws, adhesives, welding, and the like, or a combination thereof. For example, a rear surface 185 of the inner grille 106 may be formed with clips 187, such as j-clips or the like, and the inner frame 102 may be formed with corresponding slots 160 for receiving the j-clips. Accordingly, the inner grille 106 may be snapped in place on the inner frame 102 by inserting the one or more clips 187 of the inner grille into the corresponding slots 160 of the inner frame. As previously described herein, the slots 160 on the inner frame 102 may be positioned such that they are located outside the concealment flange 120 (e.g., between the bottom edge 150 and the concealment flange 120) such that, when the clips 187 of the inner grille 106 are inserted into the slots, they are concealed by the concealment flange 120 such that a user facing the forward surface 140 cannot see the clips.

Figure 5:
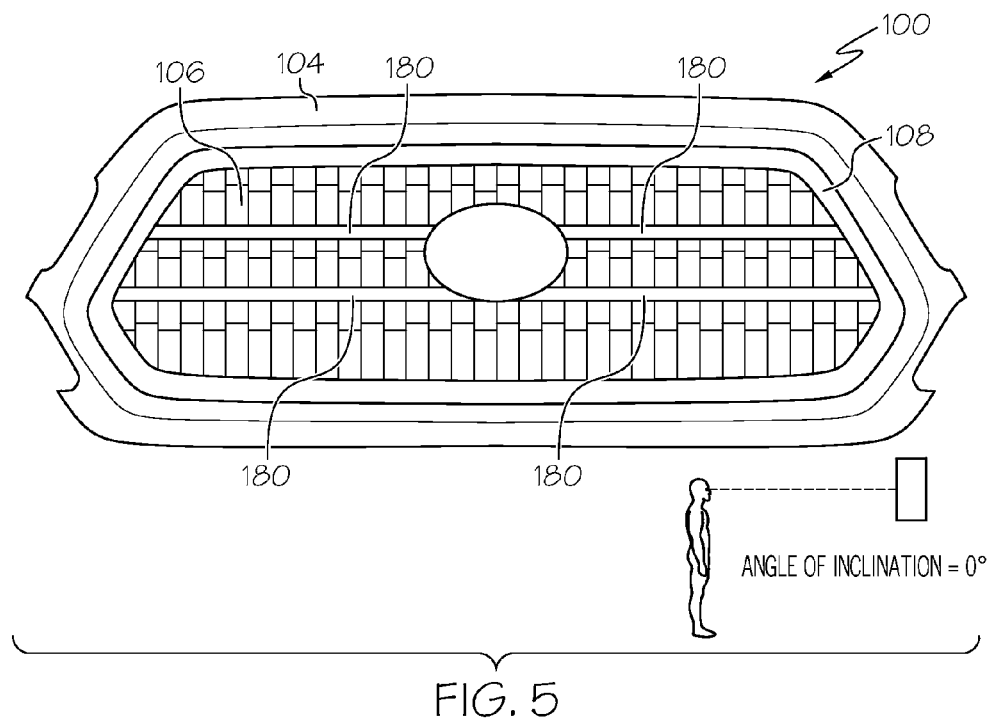
FIG. 5 schematically depicts a front elevational view of an illustrative grille assembly constructed with a concealment flange where an angle of inclination between the eye of the observer and the center of the grille assembly is zero degrees according to one or more embodiments shown and described herein.

Optionally, the grille assembly 100 may further include a trim ring 108. When a trim ring 108 is included, it may fill the a space between the inner grille 106 and the outer grille 104, thereby concealing a gap between the inner grille 106 and the outer grille 104 and obscuring any connections between the inner grille 106, outer grille 104, and the inner frame 102, thereby enhancing an aesthetic appearance of the grille assembly 100 (as best depicted in FIG. 5). Similar to the inner frame 102 and the outer grille 104, the trim ring 108 is constructed as a closed loop defining a central opening 195 therethrough to allow cooling air to enter into the engine compartment 20 through the trim ring 108, the inner grille 106, the outer grille 104 (and the opening 155 thereof), and the inner frame 102 (and the opening 125 thereof).

The trim ring 108 may further be constructed of any material, particularly materials now known or later developed for vehicle grille assemblies. In some embodiments, the trim ring 108 may be constructed from a molded polymeric resin, such as, for example, one or more thermoplastic polymers. Illustrative thermoplastic polymers may include, but are not limited to, polyolefins, polyesters, polycarbonates, polyethers, polyurethanes, polystyrenes, high-impact polystyrenes and/or the like. A particular thermoplastic polymer may be acrylonitrile butadiene styrene (ABS) plastic.

In some embodiments, the trim ring 108 may have a metalized finish such that the trim ring 108 has the appearance of being chromed. In some other embodiments, the trim ring may be painted to match the body color of the vehicle 10. For example, if the body color of the vehicle 10 is white, the trim ring 108 may be painted white.

In the embodiments described herein, the trim ring 108 may be attached to the inner frame 102 with one or more mechanical fasteners 190 such as clips, screws, adhesives, welding, and the like, or a combination thereof. For example, the rear surface of the trim ring 108 may be formed with clips 190, such as j-clips or the like, and the inner frame 102 may be formed with corresponding slots 160 for receiving the j-clips. When the trim ring 108 is positioned in the outer grille 104, the clips 190 may extend through the outer grille 104 and are received in the corresponding slots 160 formed in the inner frame 102 such that the trim ring may be snapped in place on the inner frame.

Referring now to FIGS. 5-8, the view through the grille assembly 100 is schematically depicted for different viewing angles to demonstrate the effectiveness of the concealment flange 120 in obscuring some of the interior of the engine compartment 20 (FIG. 1) from view, particularly various components located adjacent to the opening of the engine components, such as clips from various portions of the grille assembly and/or the like, as described in greater detail herein. Such components may be components that would normally be viewable if the concealment flange 120 were not present, particularly in areas adjacent to the lower portion 145 of the inner frame 102 and/or one or more sides of the frame. Specifically, FIG. 5 depicts a first view of the interior of the engine compartment of the vehicle through the grille assembly 100 when observed at a viewing angle of inclination that is zero degrees. Such a viewing angle of inclination may generally occur when the grille assembly 100 is about eye level for the viewer. As shown in FIG. 5, when the viewing angle of inclination is zero degrees, the concealment flange 120 is not visible through the grille assembly 100, indicating that no components concealed by the concealment flange would be visible were the concealment flange not present. The concealment flange 120 may generally not be visible at such a viewing angle of inclination because it extends substantially horizontally from the inner frame, as described in greater detail herein.

Figure 6:
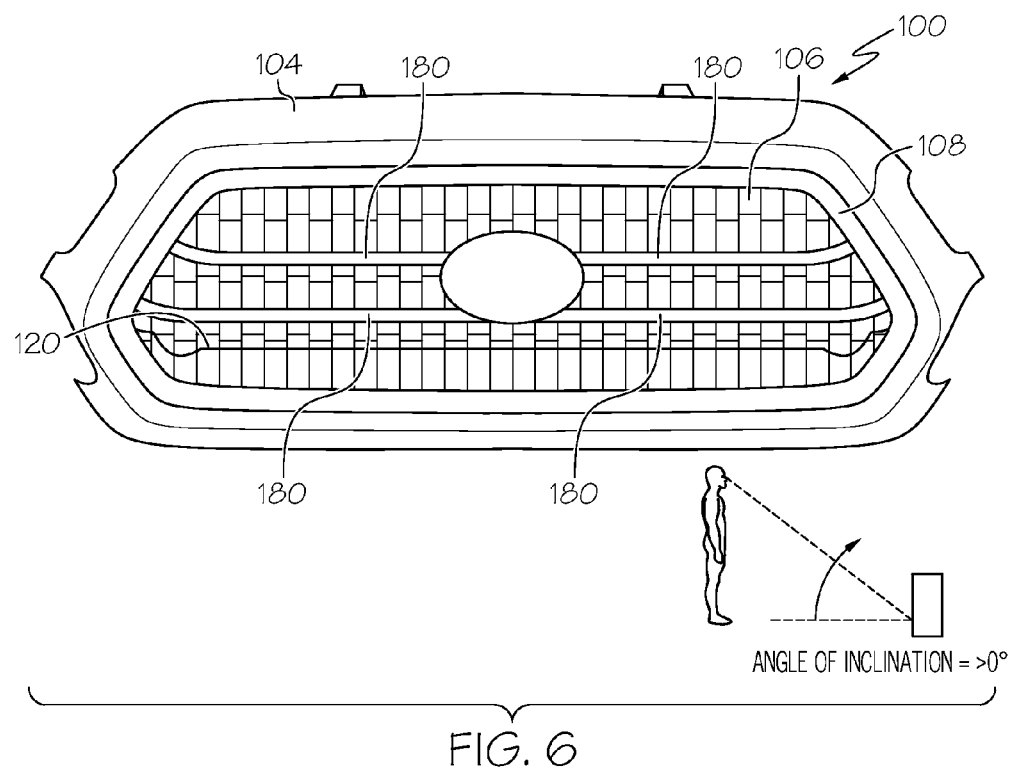
FIG. 6 schematically depicts a front elevational view of an illustrative grille assembly constructed with a concealment flange where an angle of inclination between the eye of the observer and the center of the grille assembly is greater than zero degrees according to one or more embodiments shown and described herein.

FIG. 6 schematically depicts one view of the interior of the engine compartment of the vehicle through the grille assembly 100 when observed at a viewing angle of inclination that is greater than zero degrees. Such a viewing angle of inclination may generally occur when the grille assembly is located at a lower height than an eye level height for an observer. As some vehicles may be constructed such that the opening 30 in the engine compartment 20 (FIG. 1) is lower than eye level for an average height individual when standing, the viewing angle of inclination may be a typical viewing angle for most common observations. As shown in FIG. 6, when the viewing angle of inclination is greater than zero degrees, the concealment flange 120 may be partially visible through the grille assembly 100. However, the various components located adjacent to the opening 30 of the engine compartment 20 (FIG. 1) are not visible, thereby indicating that the concealment flange 120 is effective in obscuring and concealing components located in the engine compartment adjacent to the grille assembly 100.

Figure 7:
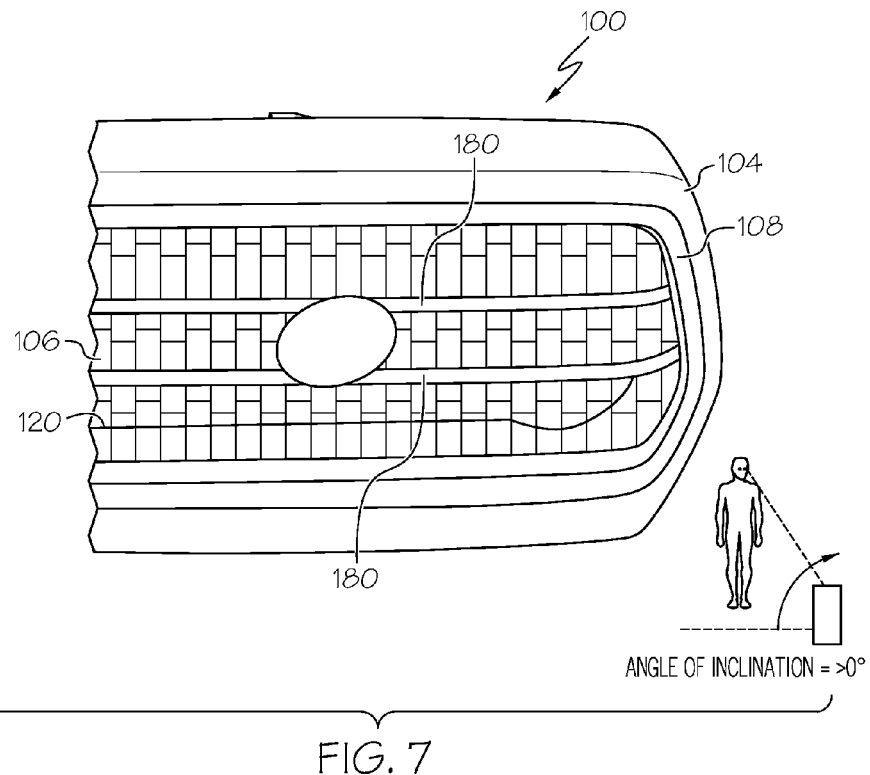
FIG. 7 schematically depicts a partial front elevational view of an illustrative grille assembly constructed with a concealment flange where an angle of inclination between the eye of the observer and the center of the grille assembly is greater than zero degrees and the observer is positioned away from the centerline of the grille assembly according to one or more embodiments shown and described herein.

FIG. 7 schematically depicts one view of the interior of the engine compartment of the vehicle through the grille assembly 100 when observed at a viewing angle of inclination that is greater than zero degrees and when the observer is positioned to one side of a center of the grille assembly. That is, the observer may be positioned at one or more locations that are off-center from the vehicle. As shown in FIG. 7, when the viewing angle of inclination is greater than zero degrees and the viewer is positioned off-center with respect to the grille assembly 100, the concealment flange 120 may be partially visible through the grille assembly 100. However, the various components located adjacent to the opening 30 of the engine compartment 20 (FIG. 1) are not visible, thereby that the concealment flange 120 is effective in obscuring and concealing components located in the engine compartment adjacent to the grille assembly 100 under these viewing conditions.

Figure 8:
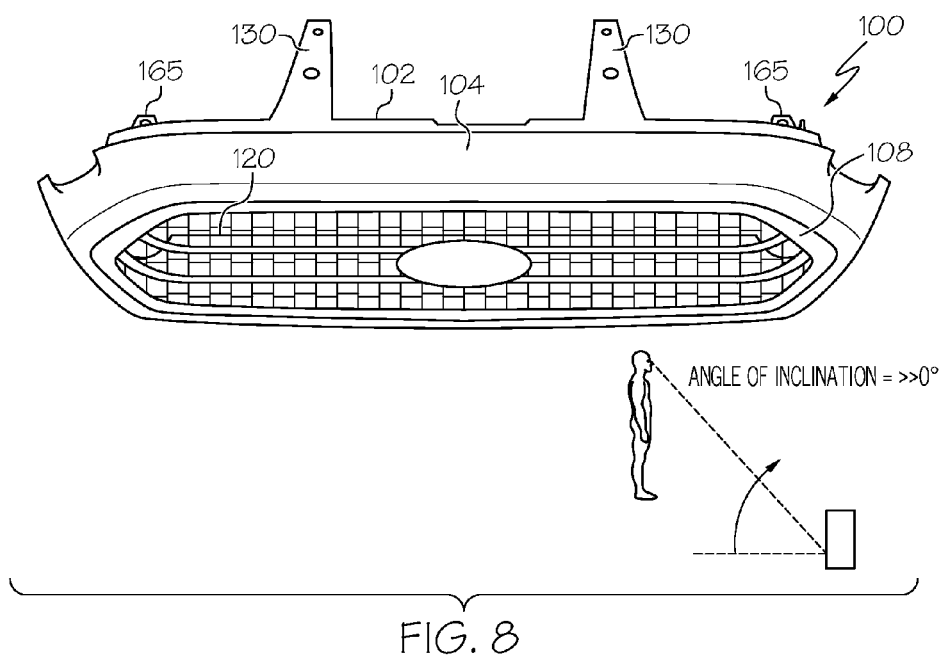
FIG. 8 schematically depicts a side perspective view of an illustrative grille assembly constructed with a concealment flange where an angle of inclination between the eye of the observer and the center of the grille assembly is significantly greater than zero degrees according to one or more embodiments shown and described herein.

FIG. 8 schematically depicts one view of the interior of the engine compartment of the vehicle through the grille assembly 100 when observed at a viewing angle of inclination that is significantly greater than zero degrees (i.e., a viewing angle of inclination that greater than the viewing angle of inclination depicted in FIG. 6). Such a viewing angle may be observed, for example, when the observer is very close to the vehicle and/or when the height difference between the height of the grille assembly 100 and the height of the observer is greater than the difference depicted in FIG. 6. As shown in FIG. 8, when the viewing angle of inclination is significantly greater than zero degrees, the concealment flange 120 is partially visible through the grille assembly 100. However, the various components located adjacent to the opening 30 of the engine compartment 20 (FIG. 1) are not visible, indicating that the concealment flange 120 is effective in obscuring and concealing components located in the engine compartment adjacent to the grille assembly 100.

Figure 9:
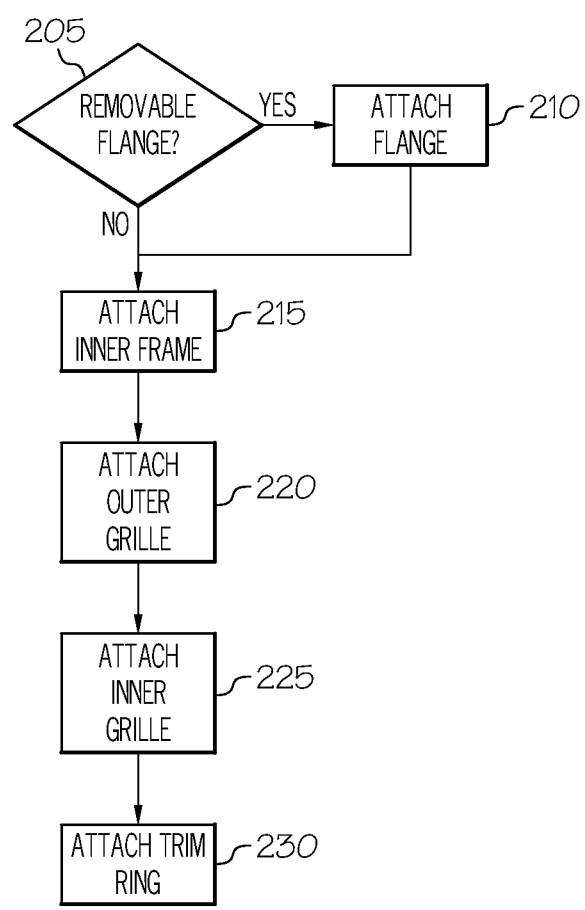
FIG. 9 depicts a flow diagram of a method of concealing one or more components positioned in an engine compartment according to one or more embodiments shown and described herein.

FIG. 9 depicts a flow diagram of an illustrative method of concealing one or more components with the grille assembly. The method described herein may be completed manually or via an automated process using one or more processing devices, a non-transitory, processor-readable storage medium containing programming instructions that are executable by the one or more processing devices, and/or one or more robotic components. A first determination 205 may be made as to whether the flange is a removably attached flange or a fixed flange, as described in greater detail herein. If the flange is removably attached, it may be attached 210 to the inner frame. If the flange is not removably attached, no attachment may be necessary because the inner frame includes the flange.

In various embodiments, the inner frame may be attached 215 to the vehicle. The inner frame may generally be attached 215 such that the concealment flange obscures one or more components that are adjacent to the central opening when viewed from a location outside the engine compartment through the grille assembly, as described in greater detail herein. In addition, the inner frame may be attached 215 such that the central opening of the inner frame allows cooling air to enter the engine compartment, as described in greater detail herein. Particularly, the inner frame may be attached 215 adjacent to an opening in the engine compartment of the vehicle, as described in greater detail herein. The inner frame may be attached 215 with any attachment mechanism, such as, for example, the attachment mechanisms described herein.

The outer grille and the inner grille portions may be attached 220, 225 to the inner frame. The outer grille may be attached 220, for example, such that it conceals at least a portion of the forward surface of the inner frame, as described in greater detail herein. Particularly, the outer grille may be attached 220 via one or more clips and/or the like that are inserted into corresponding slots in the inner frame, as described in greater detail herein. Similarly, the inner grille may be attached 225 via one or more clips and/or the like that are inserted into corresponding slots in the inner frame, as described in greater detail herein. In addition, the inner grille may be attached 225 such that the intersecting ribs extend across the central opening of the outer grille, as described in greater detail herein.

If the optional trim ring is to be included in the grille assembly, the trim ring may be attached 230. Particularly, the trim ring may be attached 230 to the inner frame. The trim ring may be attached 230 via one or more clips and/or the like that are inserted into corresponding slots in the inner frame, as described in greater detail herein. In some embodiments, the trim ring may be attached 230 such that it conceals and/or fills a space between the outer grille and the inner grille.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A grille assembly for a vehicle, the grille assembly comprising:
    an inner frame defining a central opening therethrough, the inner frame comprising a lower portion having a concealment flange, the concealment flange extending from the inner frame toward an engine compartment of the vehicle at a depth such that the concealment flange obscures from view one or more vehicle components that are positioned adjacent to the central opening when the central opening is viewed from a location outside the engine compartment through the grille assembly.

2. The grille assembly of claim 1, wherein the concealment flange is integrally formed with the inner frame.

3. The grille assembly of claim 1, wherein the concealment flange is removably attached to the inner frame.

4. The grille assembly of claim 1, wherein the depth is about 10 cm to about 20 CM.

5. The grille assembly of claim 1, wherein the concealment flange extends along at least a portion of an inner circumference of the inner frame.

6. The grille assembly of claim 1, wherein the concealment flange comprises a first portion that extends horizontally and at least one second portion that extends vertically.

7. The grille assembly of claim 1, wherein the concealment flange comprises at least one portion that extends in a substantially vertical direction to a flange height that is greater than or equal to one half of an inner frame height, but less than the inner frame height.

8. The grille assembly of claim 7, wherein the flange height is about 1 mm to about 120 mm.

9. The grille assembly of claim 7, wherein the flange height is about 118 mm.

10. The grille assembly of claim 1, further comprising:
an outer grille positioned over and attached to the inner frame such that the outer grille conceals at least a portion of a forward surface of the inner frame, wherein the outer grille defines a central opening therethrough; and
an inner grille positioned within the central opening of the outer grille, wherein the inner grille comprises a plurality of intersecting ribs that extend across the central opening of the outer grille.

11. The grille assembly of claim 10, wherein the inner frame comprises:
a first at least one slot for receiving a corresponding at least one mechanical fastener affixed to a rear portion of the outer grille for attaching the outer grille to the inner frame; and
a second at least one slot for receiving a corresponding at least one mechanical fastener affixed to a rear portion of the inner grille for attaching the inner grille to the inner frame.

12. The grille assembly of claim 10, further comprising:
a trim ring positioned over and attached to the outer grille and the inner grille such that the trim ring fills a space between the outer grille and the inner grille.

13. The grille assembly of claim 1, wherein the inner frame attaches to a perimeter of a bumper assembly portion of the vehicle.

14. A vehicle comprising:
an engine compartment; and
a grille assembly comprising an inner frame defining a central opening therethrough, wherein:
the inner frame comprises a lower portion having a concealment flange, and
the concealment flange extends from the inner frame toward the engine compartment of the vehicle at a depth such that the concealment flange obscures from view one or more vehicle components that are positioned adjacent to the central opening when the central opening is viewed from a location outside the engine compartment through the grille assembly.

15. The vehicle of claim 14, wherein the depth is about 10 cm to about 20 cm.

16. The vehicle of claim 14, wherein the concealment flange extends along at least a portion of an inner circumference of the inner frame.

17. The vehicle of claim 14, wherein the concealment flange comprises a first portion that extends horizontally and at least one second portion that extends vertically.

18. The vehicle of claim 14, wherein the concealment flange comprises at least one portion that extends in a substantially vertical direction to a flange height that is greater than or equal to one half of an inner frame height, but less than the inner frame height.

19. A method of concealing from view one or more components that are positioned at or in an engine compartment of a vehicle, the method comprising:
attaching a grille assembly comprising an inner frame that defines a central opening therethrough to a perimeter of an opening in the engine compartment,
wherein:
the inner frame comprises a lower portion having a concealment flange, and
the concealment flange extends from the inner frame towards the engine compartment at a depth such that the concealment flange obscures from view the one or more components that are positioned adjacent to the central opening when the central opening is viewed from a location outside the engine compartment through the grille assembly.

20. The method of claim 19, further comprising:
attaching an outer grille over the inner frame such that the outer grille conceals at least a portion of a forward surface of the inner frame, wherein the outer grille defines a central opening therethrough;
attaching an inner grille within the central opening of the outer grille, wherein the inner grille comprises a plurality of intersecting ribs that extend across the central opening of the outer grille; and
attaching a trim ring over the outer grille and the inner grille such that the trim ring fills a space between the outer grille and the inner grille.

21. The grille assembly of claim 1, wherein the concealment flange extends such that the concealment flange obscures from view one or more components located within the engine compartment of the vehicle.

22. The grille assembly of claim 1, wherein the one or more vehicle components comprise one or more clips or fasteners that attach the grille assembly to the vehicle.

* * * * *